United States Patent
Dubois et al.

(10) Patent No.: US 8,205,986 B2
(45) Date of Patent: Jun. 26, 2012

(54) METHOD FOR GENERATING A TRIMMING SETPOINT FOR AN OPHTALMIC LENS FOR IT TO BE FITTED IN A HALF-RIM SPECTACLE FRAME

(75) Inventors: Frédéric Dubois, Charenton le Pont (FR); David Freson, Charenton le Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 77 days.

(21) Appl. No.: 12/875,590

(22) Filed: Sep. 3, 2010

(65) Prior Publication Data

US 2011/0141435 A1   Jun. 16, 2011

(30) Foreign Application Priority Data

Sep. 14, 2009   (FR) ..................................... 09 04383

(51) Int. Cl.
*G02C 13/00* (2006.01)
(52) U.S. Cl. .................................. 351/159.73; 351/178
(58) Field of Classification Search .................. 351/177, 351/178
See application file for complete search history.

(56) References Cited

U.S. PATENT DOCUMENTS 7,253,974 B2 * 8/2007 Guillermin et al. ........... 359/819

FOREIGN PATENT DOCUMENTS

| EP | 1642678 A1 | 4/2006 |
|---|---|---|
| EP | 2027968 A1 | 2/2009 |
| EP | 2028532 A1 | 2/2009 |
| WO | 2009065963 A1 | 5/2009 |

OTHER PUBLICATIONS

French Search Report, dated Jan. 6, 2010, corresponding from French Application.

* cited by examiner

*Primary Examiner* — Darryl J Collins
(74) *Attorney, Agent, or Firm* — Young & Thompson

(57) ABSTRACT

A method for generating a trimming setpoint for an ophthalmic lens for it to be fitted in a surround of a half-rim spectacle frame, includes the steps of:
  a) acquiring the planar coordinates of a plurality of first points characterizing the shape of a first longitudinal profile of the surround;
  b) determining the spatial coordinates of second points of a second longitudinal profile, obtained from a projection of the first longitudinal profile onto a predetermined reference surface,
  c) calculating the perimeter length of the second longitudinal profile,
  d) determining the spatial coordinates of third points of a third longitudinal profile, obtained from a projection of the first or of the second longitudinal profile on a curved surface deduced from a shape parameter of the ophthalmic lens,
  e) correcting the spatial coordinates of the third points, so as to equalize the perimeter length of the third longitudinal profile with the perimeter length of the second longitudinal profile,
  f) deducing the machining setpoint from the corrected spatial coordinates.

12 Claims, 4 Drawing Sheets

Figure 1:
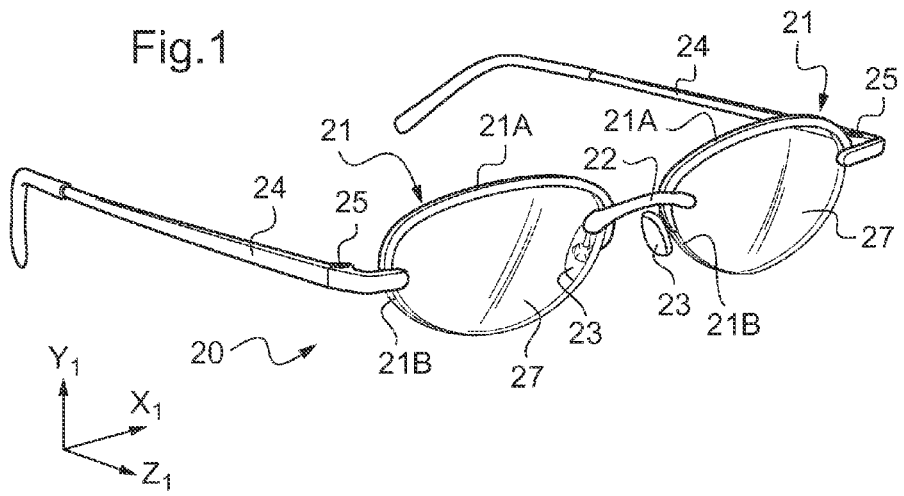

METHOD FOR GENERATING A TRIMMING SETPOINT FOR AN OPHTALMIC LENS FOR IT TO BE FITTED IN A HALF-RIM SPECTACLE FRAME

TECHNICAL FIELD OF THE INVENTION

The present invention relates generally to the preparation of ophthalmic lenses for them to be fitted in surrounds of half-rim spectacle frames (Nylor type).

TECHNOLOGICAL BACKGROUND

The technical part of the optician's profession consists in fitting a pair of corrective ophthalmic lenses in a spectacle frame selected by a wearer.

This fitting breaks down into three main operations:
acquisition of the contours of the surrounds of the selected spectacle frame,
centering of the lenses which consists in transferring the two acquired contours onto the two ophthalmic lenses, in a position and according to an orientation such that, once fitted in the spectacle frame, the lenses are appropriately centered facing the corresponding pupils of the wearer, then
machining of the lenses, which consists in cutting them along these contours.

In the context of the present invention, interest is more particularly focused on half-rim spectacle frames, which comprise two half-rims (or "arches"), each closed by a thread usually made of nylon.

These spectacle frames are generally delivered to the optician with two presentation lenses.

For the acquisition operation, the optician uses a contour reading appliance which comprises a rod-shaped feeler, arranged so that its cylindrical face can slide along the edge of each presentation lens. This appliance is used to determine the planar coordinates, that is to say the coordinates in two dimensions, of a longitudinal profile running along each presentation lens.

As for the machining operation, this consists in cutting the ophthalmic lens along a trajectory derived from said planar coordinates, so that this lens can be mechanically and esthetically adapted to the shape of the surround of the selected frame, while best performing the optical function for which it was designed.

The machining operation comprises in particular a groove-forming step, for forming a fitting groove on the edge of the lens. When fitting the lens in the surround, this fitting groove is engaged on a rib that runs along the internal face of the corresponding arch of the frame. The ophthalmic lens is then kept pressed against this arch by means of the nylon thread which is engaged in the fitting groove.

The acquisition and machining operations must be performed with care so that each lens can be perfectly fitted into its surround, without force and "at the first attempt", that is to say, without requiring remachining or bending the nylon thread.

Despite the care paid to these operations, it is observed that some ophthalmic lenses remain difficult to fit in their surrounds. It is then necessary, to dispel any risk of the lens slipping out of its surround, to remachine the lens and/or modify the length of the nylon thread, which is tedious to do.

OBJECT OF THE INVENTION

In order to remedy the abovementioned drawback in the state of the art, the present invention proposes a method for generating a trimming setpoint for an ophthalmic lens, that makes it possible to equalize the perimeter length of the machined lens with that of the corresponding surround of the spectacle frame.

More particularly, there is proposed according to the invention a method for generating a trimming setpoint comprising the steps consisting in:

a) acquiring the planar coordinates of a plurality of first points characterizing the shape of a first longitudinal profile of said surround;

b) determining the spatial coordinates of second points of a second longitudinal profile, obtained from a projection of said first longitudinal profile onto a predetermined reference surface, c) calculating the perimeter length of said second longitudinal profile, d) determining the spatial coordinates of third points of a third longitudinal profile, obtained from a projection of the first or of the second longitudinal profile on a curved surface deduced from a shape parameter of the ophthalmic lens, e) correcting the spatial coordinates of the third points, so as to equalize the perimeter length of the third longitudinal profile with the perimeter length of the second longitudinal profile, f) deducing said machining setpoint from said corrected spatial coordinates.

The surrounds and the presentation lenses generally have curves that are different from those of the ophthalmic lenses to be fitted in these surrounds. Consequently, when an ophthalmic lens is machined according to the planar coordinates of a longitudinal profile acquired on a surround or on a presentation lens, the ophthalmic lens ultimately has a three-dimensional perimeter length that is different from that of the surround. This difference in perimeter lengths, dependent on the difference between the curves of the surround and of the ophthalmic lens, is the reason for the fitting difficulties that are encountered.

According to the invention, in the step e), the third longitudinal profile according to which the lens will be trimmed is corrected, so as to ensure that the lens ultimately has a perimeter length equal to that of the surround.

One particular difficulty in making this correction consists in determining the perimeter length of the surrounds of the half-rim spectacle frame. In practice, the acquisition in the step a) of just the planar coordinates of the points of the first longitudinal profile does not make it possible to calculate the perimeter length of this surround.

This is also the reason why such a method of equalizing the perimeter lengths was hitherto not applicable to half-rim spectacle frames.

Indeed, the document WO 2009 065963 discloses a method for equalizing the perimeter lengths of full-rim spectacle frames, comprising a step for acquiring the three-dimensional shape of a longitudinal profile of one of the surrounds of this frame, a step for calculating the perimeter length of this longitudinal profile, a step for projecting this longitudinal profile onto the front face of the lens, and a step for distorting this projected longitudinal profile so that it has a perimeter length identical to that initially calculated.

The technical problem of the present invention, which consists in equalizing the perimeter length of the longitudinal profile according to which the lens will be trimmed with that of the longitudinal profile acquired on a half-rim spectacle frame delivered with presentation lenses, does not, however, arise in that document.

In fact, in that document, the method is applicable only to the spectacle frames for which the three-dimensional shape of the surrounds is known. It applies, for example, to half-rim spectacle frames delivered with templates that make it possible, by virtue of a database supplied by the frame manufacturer, to know the three-dimensional shape of the surrounds of this frame. This method is not, however, applicable to most half-rim spectacle frames, which are delivered with two presentation lenses, which denies the optician any possibility of easily acquiring the three-dimensional shape of its surrounds.

In the present invention, the applicant has observed that the presentation lenses are generally cut from templates that have a curve that is either standard or can easily be acquired (through a database, by a geometrical or optical measurement, etc).

According to the invention, in the step b), the planar coordinates acquired from the first longitudinal profile are then projected onto a reference surface which has such a curve.

Thus, this projection makes it possible to determine the spatial (or three-dimensional) coordinates of the longitudinal profile of the presentation lens, which makes it possible to calculate its perimeter length.

By virtue of this step b), the method consisting in equalizing the perimeter lengths of the ophthalmic lenses with those of their surrounds then becomes applicable to half-rim spectacle frames.

Other advantageous and nonlimiting features of the method according to the invention are as follows:
  in the step a), the planar coordinates of the first points are acquired by reading, with or without contact, the contour of a presentation lens associated with said surround;
  in the step b), the predetermined reference surface is spherical;
  the radius of curvature of the spherical reference surface is equal to a mean radius of curvature, predetermined from the radii of curvature of a representative range of presentation lenses;
  in the step a), the planar coordinates of the first points are acquired in an acquisition plane and in the step b), the projection is an orthogonal projection along an axis orthogonal to said acquisition plane;
  in the step b), said projection consists in a calculation of the altitudes of the second points relative to the acquisition plane, according to said mean radius of curvature and the planar coordinates of the first points;
  in the step c), the perimeter length of the second longitudinal profile is calculated according to the spatial coordinates of the second points;
  in the step d), said curved surface is the front or rear face of the ophthalmic lens;
  in the step d), said curved surface is a surface situated between the front and rear faces of the ophthalmic lens;
  said curved surface is parallel to one of the front and rear faces of the ophthalmic lens;
  in the step a), the first longitudinal profile is acquired in a frame of reference of the surround identified by a horizontal axis, and, in the step d), the third longitudinal profile is determined in a frame of reference of the ophthalmic lens identified by a horizontal axis, previously made to coincide with the frame of reference of the surround, by aligning their horizontal axes.

DETAILED DESCRIPTION OF AN EXEMPLARY EMBODIMENT

The following description, in light of the appended drawings, given as a nonlimiting example, will give a clear understanding of what the invention consists of and how it can be implemented.

Figure 2:
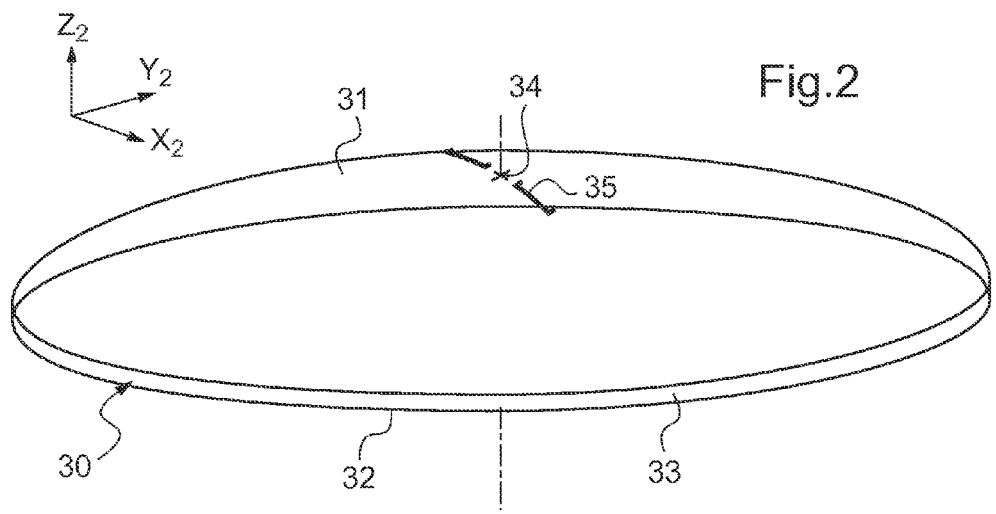
Figure 3:
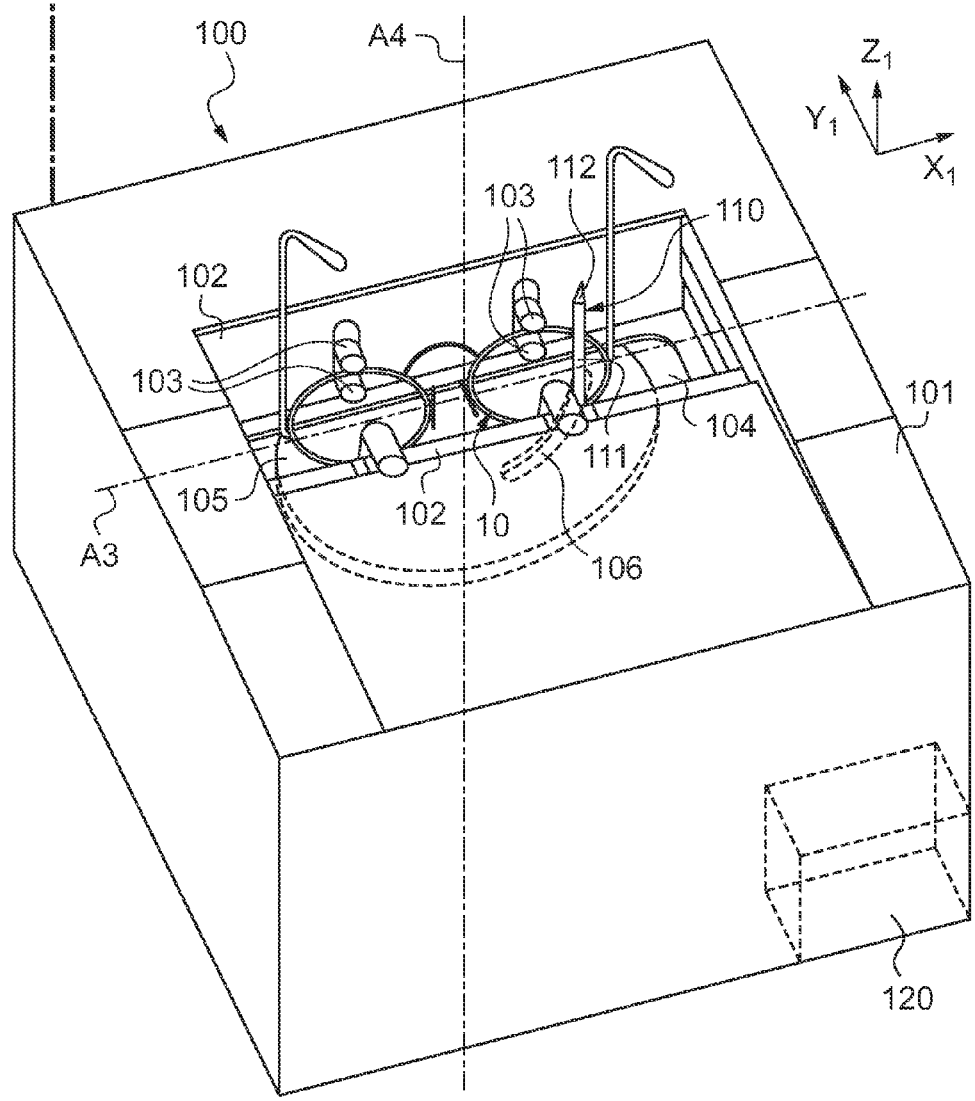
Figure 4:
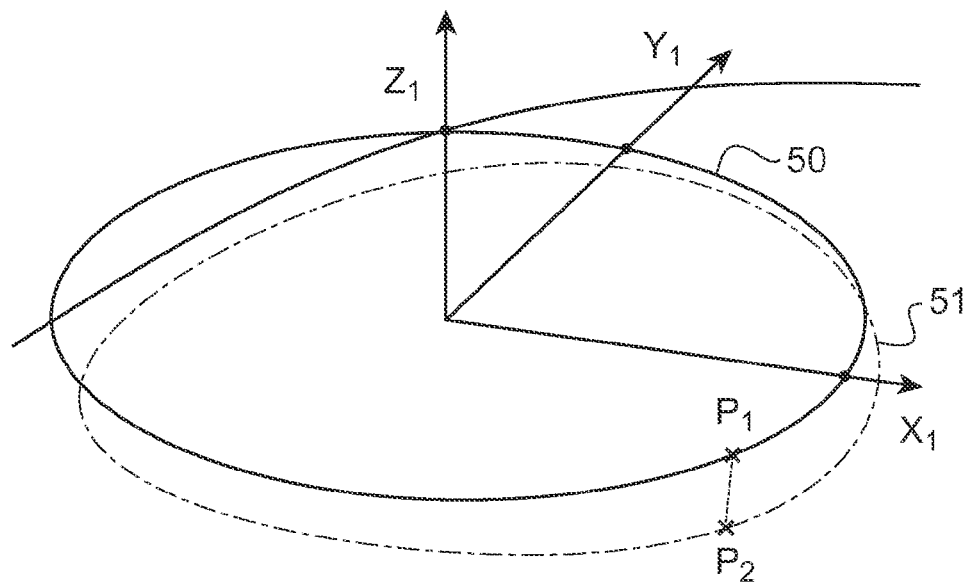
Figure 5:
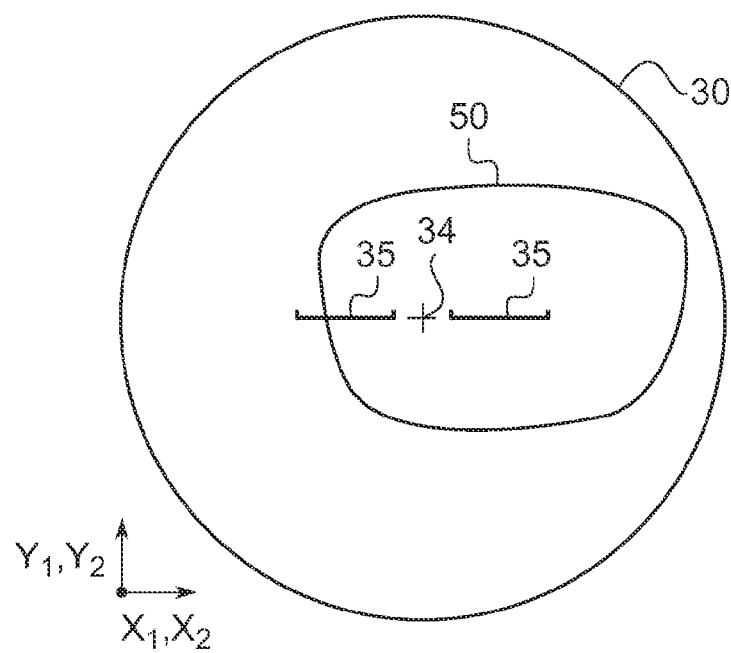
Figure 6:
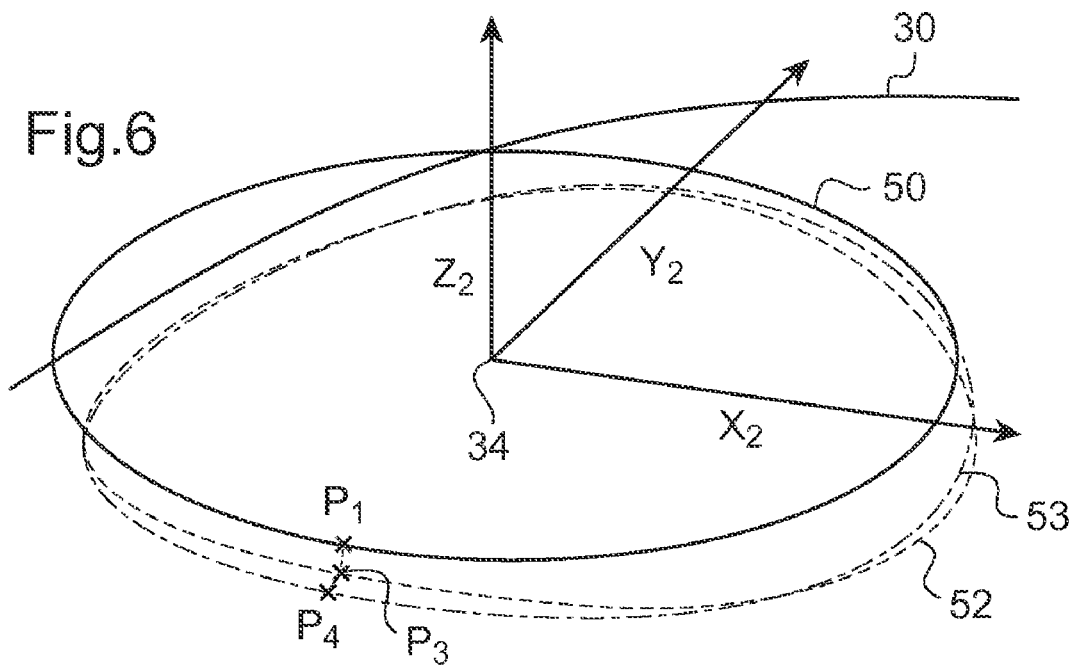
Figure 7:
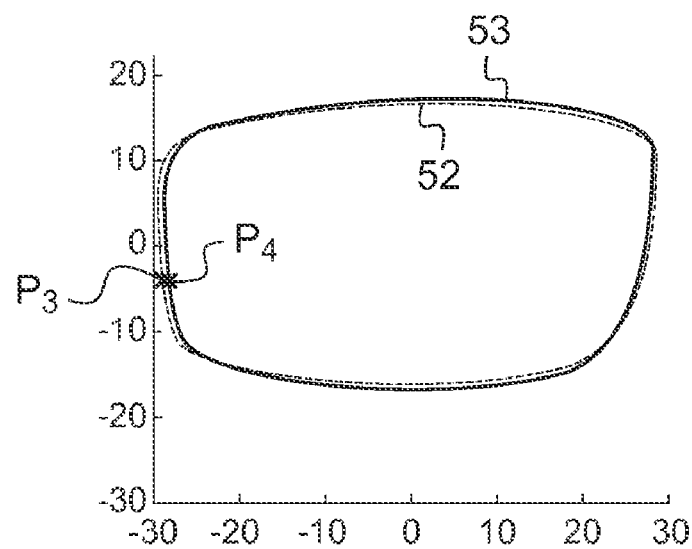

In the appended drawings:
  FIG. 1 is a perspective diagrammatic view of a half-rim spectacle frame with two presentation lenses;
  FIG. 2 is a perspective diagrammatic view of an untrimmed ophthalmic lens;
  FIG. 3 is a perspective diagrammatic view of a contour reading appliance;
  FIG. 4 is a view of a two-dimensional longitudinal profile representative of the shape of one of the presentation lenses of the spectacle frame of FIG. 1 and of its projection in three-dimensions onto a face of this presentation lens;
  FIG. 5 is a front view of the ophthalmic lens of FIG. 2, on which is superimposed the two-dimensional longitudinal profile of FIG. 4;
  FIG. 6 is a perspective view of the two-dimensional longitudinal profile of FIG. 4, of its projection onto a face of the ophthalmic lens of FIG. 2, and of a distortion of this projection in order to calculate a trimming setpoint for this ophthalmic lens;
  FIG. 7 is a view in the plane of the projected longitudinal profile of FIG. 6 and of its distortion.

SPECTACLE FRAME

FIG. 1 shows a half-rim spectacle frame 20, comprising two surrounds 21.

The surrounds 21 of the spectacle frame 20 each comprise an arch 21A (or "half-rim") and a nylon thread 21B, the two ends of which are connected to the ends of this arch 21A. These arches 21A and nylon threads 21B are used in combination to secure two lenses onto the spectacle frame 20.

The two arches 21A are linked to one another by a bridge 22. Each arch 21A is fitted with a nose pad 23 which is able to rest on the nose of the wearer and with an temple arm 24 able to rest on one of the ears of the wearer. Each temple arm 24 is hinged on the corresponding arch 21A by means of a threaded barrel 25.

The two arches 21A of the spectacle frame 20 have an internal edge along which runs a fitting rib.

As can be seen in FIG. 1, the spectacle frame 20 has two presentation lenses 27 delivered to the optician with the frame.

The two surrounds 21 have a non-zero curve. This curve can be characterized by the radius of curvature of the spherical front face of the presentation lens 27.

Ophthalmic Lens

As shown in FIG. 2, the ophthalmic lens 30 has two front 31 and rear 32 optical faces, and an edge 33.

The front optical face 31 is in this case spherical and has a known radius of curvature.

The edge 33 of the lens has a circular initial contour. The lens is, however, intended to be trimmed to the shape of the corresponding surround 21 of the spectacle frame 20, so that it can be fitted in the latter.

The ophthalmic lens 30 is more specifically intended to be trimmed to have, on its edge 33, a fitting groove which is able to be engaged on the fitting rib of the corresponding arch 21A of the spectacle frame and which can accommodate the nylon thread 21B.

This ophthalmic lens 30 has optical characteristics that are determined according to the requirements of the spectacles wearer. It has in particular spherical, cylindrical and prismatic refringence properties which are specific to the wearer.

This ophthalmic lens 30 is also provided with markings which allow convenient identification of the optical frame of reference of the ophthalmic lens 30 for its fitting in the spectacle frame 10, 20 selected by the wearer. These markings in this case consist of temporary ink markings 34, 35. As a variant, they could consist of permanent markings, such as micro-engravings.

In this case, these markings comprise a centering cross 34 with which to identify the position of the centering point of the lens, that is to say, in the case of a lens that has an exclusively spherical optical power, the point where the incident ray and the transmitted ray have the same axis.

It also comprises, either side of this centering cross 34, two horizon lines 35 identifying the horizontal of the ophthalmic lens 30.

The optical frame of reference of the ophthalmic lens 30 is then characterized by an orthonormed fix comprising a horizontal axis $X_2$ parallel to said horizon lines 35, an ordinate axis $Y_2$, and a normal axis $Z_2$ which is perpendicular to the plane tangential to the front face of the ophthalmic lens 30 at the centering point 34.

Client and Manufacturer Terminals

The invention offers a particular advantage when the preparation of the lenses is entrusted to lens manufacturers distinct from the opticians, that is to say, when the opticians act as "order-givers" who subcontract the manufacturing and trimming of the lenses to such manufacturers.

To illustrate this configuration, we will consider here, on the one hand, a client terminal installed with an optician for ordering lenses, and, on the other hand, a manufacturer terminal installed with a lens manufacturer for the manufacture and trimming of lenses.

The client terminal comprises a computer unit 150 (FIG. 3), in this case a desktop computer, for storing and transmitting ophthalmic lens order data, for example via an IP-based (Internet type) communication protocol. These order data comprise prescription data relating to the corrections to be made to the eyes of the wearer and shape data relating to the spectacle frame 10, 20 selected by the wearer.

The manufacturer terminal comprises a computer unit 250 for receiving, storing and processing the order data transmitted by the client terminal. It also comprises an ophthalmic lens manufacturing device, comprising, for example, means for molding lenses in accordance with the prescription data and means for trimming lenses in accordance with the shape data.

Contour Reading Appliance

In the client terminal, the optician in this case has a contour reading appliance. This contour reading appliance is a means that is well known to those skilled in the art and is not in itself the subject of the invention being described. It is, for example, possible to use a contour reading appliance as described in the patent EP 0 750 172 or marketed by Essilor International under the brand name Kappa or under the brand name Kappa CT.

FIG. 3 is an overview of this contour reading appliance 100, as it appears to its user. This appliance is equally well suited to recording the shape of the surrounds of full-rim spectacle frames 10 and of half-rim spectacle frames 20. To this end, it has a top cover 101 covering all of the appliance apart from a central top portion in which can be arranged a full-rim spectacle frame 10 or a presentation lens 27.

The contour reading appliance 100 is intended to record, in the case where the selected spectacle frame is of the full-rim type, the shape of the bottom edge of the groove of each rim of this spectacle frame 10. On the other hand, in the case where the selected spectacle frame is of the half-rim type, it is intended to record the shape of the contour of each presentation lens 27.

The contour reading appliance 100 comprises, for this purpose, first means for securing a full-rim spectacle frame 10, and second means for securing a presentation lens 27.

The first securing means comprise a set of two jaws 102 that move relative to one another and are provided with two pairs of posts 103 that move to form two clamps suitable for gripping the full-rim spectacle frame 10 in order to immobilize it.

The second securing means, which cannot be seen in the figures, comprise a pin that extends just into the central top portion of the appliance, and the top end of which is arranged to cooperate with one of the faces of the presentation lens 27, in order to immobilize it in this central top portion.

In the space left visible through the opening of the cover 101, a frame 104 can be seen. A deck (not visible) can be moved in translation on this frame 104 along a transfer axis A3. A revolving plate 105 is mounted to revolve on this deck.

This revolving plate 105 is therefore able to assume three positions on the transfer axis A3, namely:
  a first position in which the center of the revolving plate 105 is positioned between the two pairs of posts 103 securing the right rim of the spectacle frame 10,
  a second position in which the center of the revolving plate 105 is positioned between the two pairs of posts 103 securing the left rim of the spectacle frame 10, and
  a third intermediate position in which the center of the revolving plate 105 is located in the axis of the pin securing the presentation lens 27.

The revolving plate 105 has a rotation axis A4 defined as the axis normal to the front face of this revolving plate 105 and passing through its center. It is designed to pivot about this axis relative to the deck. The revolving plate 105 also includes an arc-of-circle-shaped oblong opening 106 through which a feeler 110 projects. This feeler 110 comprises a support rod 111 with an axis perpendicular to the plane of the front face of the revolving plate 105 and, at its free end, a feeling finger 112 with an axis perpendicular to the axis of the support rod 111.

The feeling finger 112 is used to feel the grooves of the rims of the full-rim spectacle frames 10.

The support rod 111 is arranged to slide along the contour of the presentation lens 27.

The shape reading appliance 100 comprises actuation means (not represented) that are adapted, firstly, to slide the support rod 111 along the opening 106 in order to modify its radial position relative to the rotation axis A4 of the revolving plate 105, secondly, to vary the angular position of the revolving plate 105 about its rotation axis A4, and, thirdly, to position the feeling finger 112 of the feeler 110 at a greater or lesser altitude relative to the plane of the front face of the revolving plate 105.

To sum up, the feeler 110 is provided with three degrees of freedom, namely a first degree of freedom $\rho$ consisting of the ability of the feeler 110 to be moved radially relative to the rotation axis A4 by virtue of its freedom of movement along the arc of circle formed by the opening 106, a second degree of freedom $\theta$ consisting of the ability of the feeler 110 to pivot about the rotation axis A4 by virtue of the rotation of the revolving plate 105 relative to the deck, and a third degree of freedom z consisting of the ability of the feeler 110 to be translated along an axis parallel to the rotation axis A4 of the revolving plate 105.

Each point read by the feeler 110 is identified in a frame of reference, called the frame mounted coordinate system.

This frame of reference is in this case characterized by an orthonormed fix comprising a horizontal axis $X_1$ parallel to said transfer axis A3, an ordinate axis $Y_1$ orthogonal to the transfer A3 and rotation A4 axes, and a normal axis $Z_1$.

The contour reading appliance 100 also comprises an electronic and/or computer device 120 that is used, on the one hand, to drive the actuation means of the shape reading appliance 100, and, on the other hand, to acquire and transmit to the computer unit 150 the coordinates of the feeler 110.

Method for Generating Trimming Setpoints

The method for preparing an ophthalmic lens 30 for it to be fitted into a surround 21 of a spectacle frame 20 comprises two main phases, namely a first phase for generation of a trimming setpoint and a second phase for trimming the ophthalmic lens according to this trimming setpoint.

The invention relates more specifically to the first phase for generating the trimming setpoint. The second phase, well known to those skilled in the art, is not in itself the subject of the present invention and will therefore not be described here.

The first phase for generating the trimming setpoint breaks down into six successive operations.

First Operation

The first operation consists in defining the needs of the spectacle wearer.

For this, the wearer goes in turn to an optometrist and to an optician.

The optometrist carries out various examinations relating to the visual acuity of the wearer, so as to determine prescriptions that will be used to grind two ophthalmic lenses adapted to each of the eyes of the wearer. He determines in particular the unifocal, bifocal or progressive type of the ophthalmic lenses, and the spherical, cylindrical and prismatic refringence properties of these lenses.

As for the optician, he allows the wearer to select an appropriate spectacle frame 20. He then proceeds with the measurements that are necessary for the centering of the ophthalmic lenses on the selected frame, so that, once assembled on the frame, the lenses are correctly centered facing the eyes of the wearer in order to best perform the optical functions for which they are designed.

The optician determines in particular the position of the pupillary points of the wearer within the mounted frame of reference of the frame. These pupillary points correspond to the points arranged facing the pupils of the wearer on the lenses fitted in the selected frame. The pupillary points are more particularly identified relative to the contour of each surround 21 of the selected spectacle frame 20, by means of two parameters called pupillary distance and pupillary height. The pupillary distance corresponds to the greatest horizontal distance between the pupillary point and the nasal area of the surround. The pupillary height corresponds to the greatest vertical distance between the pupillary point and the bottom area of the surround.

Second Operation

The second operation consists in recording the shapes of the contours of the surrounds 21 of the selected spectacle frame 20, by means of a contour reading appliance 100 such as that represented in FIG. 3.

Initially, the presentation lens 27 is immobilized in the second securing means of the contour reading appliance 100, at the center of the top central opening of the cover 101, so that its edge can be felt over its entire contour by the support rod 111.

In the initial position, when the support rod 111 is arranged against the edge of the presentation lens 27, the electronic and/or computer device 120 defines as zero the angular position $\theta_1$ of the feeler 110.

The actuation means then pivot the revolving plate 105. During this pivoting, the actuation means impose a constant radial force on the feeler 110 toward the rotation axis A4, so that the support rod 111 of the feeler 110 remains in contact with the edge of the presentation lens 27.

During the rotation of the revolving plate 105, the electronic and/or computer device 120 records the planar coordinates $\rho_1, \theta_1$ of a plurality of first points $P_1$ of the edge of the presentation lens 27 (for example 360 points angularly separated by 1 degree). These 360 felt points $P_1$ in this case also define a longitudinal profile of the surround 21 of the half-rim spectacle frame (or "first longitudinal profile).

Then, the planar coordinates $\rho_1, \theta_1$ of the 360 felt points $P_1$ are transmitted by the electronic and/or computer device 120 to the computer unit 150 of the client terminal.

Obviously, as a variant, the coordinates of the longitudinal profile of the surround could be acquired by other means, for example optically, using a laser appliance or an image capture and processing appliance arranged to determine, from a snapshot of the selected spectacle frame, the coordinates of a plurality of points of each of its surrounds.

These coordinates could also be acquired from data supplied by the spectacle frame manufacturer. They could also be acquired from a database in which the optician could enter the two-dimensional shapes of the surrounds of the spectacle frames that he has available, so that he has to acquire these shapes only once.

In this case, at the end of this second operation, the computer unit 150 of the client terminal transmits all the acquired data to the computer unit 250 of the manufacturer terminal. These data comprise in particular the prescriptions of the wearer and the coordinates of the 360 felt points $P_1$.

These data are then used to grind the two ophthalmic lenses of the wearer and to machine their optical faces to the desired shape, according to methods that are not the subject of the present invention.

These data are then used to trim the duly obtained ophthalmic lenses, in order to adjust their contours to the desired shape, as will be detailed later in this explanation.

Third Operation

The third operation consists in calculating the perimeter length $I_1$ of the surround 21 of the selected spectacle frame 20.

To generate the trimming setpoint, the computer unit 250 must, in practice, determine this other trimming parameter, so that the ophthalmic lens 30, once trimmed, has a contour with a perimeter length equal to the perimeter length of the surround 21.

Since the spectacle frame 20 is half-rim, only the planar coordinates $x_1, y_1$ of 360 felt points $P_1$ are known, which does not make it possible to directly calculate the perimeter length $I_1$ of the surround 21.

Since the longitudinal profile has been acquired in two dimensions in the plane $(X_1; Y_1)$, it is then necessary, as shown more particularly in FIG. 4, to distort this acquired longitudinal profile 50 so as to give it a curvature (along the axis $Z_1$) which corresponds to the curvature of the surround 21.

For this, the computer unit determines the spatial coordinates $x_2, y_2, z_2$ of 360 second points $P_2$ of a second longitudinal profile (called the curved profile 51), obtained from the projection of the 360 points $P_1$ onto a predetermined reference surface.

This predetermined reference surface is in this case representative of the shape of the front face of the presentation lens 27. It is in this case spherical. Its radius of curvature $Rc_1$ is equal to a mean radius of curvature, calculated from the radii of curvature of a representative range of presentation lenses (the radii of curvature of the presentation lenses are in fact usually identical or similar).

The projection is in this case an orthogonal projection along the normal axis $Z_1$. Consequently, the planar coordinates $x_2, y_2$ of the 360 projected points $P_2$ of the curved profile 51 are equal to the planar coordinates $x_1, y_1$ of the 360 points of the acquired longitudinal profile 50.

To put it in a different way, the projection of the acquired longitudinal profile 50 consists, for the computer unit 250, of a simple calculation of the altitudes $z_2$ of the points $P_2$ of the curved profile 51 according to the radius of curvature $Rc_1$ and the planar coordinates $x_1, y_1$ of the points $P_1$, according to the following formula:

$$z_2 Rc_1 - \sqrt{Rc_1^2 - \rho_1^2} \text{ with } \rho_1 = (x_1^2 + y_1^2)^{1/2}$$

The spatial coordinates $x_2, y_2, z_2$ of the points $P_2$ of the curved profile 51 being known, the computer unit 250 then calculates the perimeter length $I_2$ of the curved profile 51, according to the following formula:

$$I_2 = \Sigma_{i=0}^{359} \sqrt{(x_{2,i+1} - x_{2,i})^2 + (y_{2,i+1} - y_{2,i})^2 + (y_{2,i+1} - y_{2,i})^2}$$

This perimeter length $I_2$ of the curved profile 51 is considered to be equal to the perimeter length $I_1$ of the surround 21.

As a variant, the curvature of the predetermined reference surface onto which are projected the 360 points $P_1$ can be determined differently.

It can be directly measured on the front face of the presentation lens 27, by acquiring the spatial coordinates of three points of the front face of this presentation lens and by deducing therefrom its radius of curvature.

This curvature can also be supplied by the manufacturer of the selected spectacle frame, in the form of a radius of curvature or of a meshing of one of the faces of the presentation lens.

It can also be read from a database in which the optician would enter the radii of curvature of the presentation lenses of the spectacle frames that he has available, so that he has to acquire these radii of curvature only once.

Fourth Operation

The fourth operation consists in centering, orienting and projecting the longitudinal profile of the surround 21 onto the ophthalmic lens 30 so that, once assembled in the spectacle frame, the lens trimmed according to this projected longitudinal profile is appropriately centered facing the pupil of the corresponding eye of the wearer.

In the centering step, as FIG. 5 shows, the aim is to make the mounted frame of reference of the spectacle frame 20 coincide with the optical frame of reference of the ophthalmic lens 30.

This coincidence is achieved by aligning the horizontal axes $X_1, X_2$, the ordinate axes $Y_1, Y_2$, and the normal axes $Z_1, Z_2$ of the fixes associated with these two frames of reference, then by centering the pupillary point (and therefore the longitudinal profile) identified in the fix $X_1, Y_1, Z_1$ of the frame on the centering point 34 identified in the fix $X_2, Y_2, Z_2$ of the lens.

In the orientation step, the aim is to orient the longitudinal profile of the surround 21 around the centering point 34 at a determined angle relative to the horizon lines 35 of the ophthalmic lens 30. This angle is determined by the optometrist, and is therefore included in the prescriptions of the wearer. It can be used to check that, once the lens is mounted in the surround, the distribution of its optical powers is appropriate to the corresponding eye of the wearer.

In the projection step, the aim is to rectify the shape of the longitudinal profile of the surround 21, which does not have a curvature identical to that of the ophthalmic lens 30, in order to give it such a curvature.

This step is more specifically carried out by projecting the longitudinal profile of the surround 21 onto the front face 31 of the ophthalmic lens 30, so as to be able to deduce the contour along which the ophthalmic lens 30 must be trimmed.

Obviously, as a variant, this projection could be done onto another curved surface characteristic of the ophthalmic lens 30. It could, for example, be done onto the rear face 32 of the ophthalmic lens 30. It could also be done onto an intermediate surface having a curvature identical to that of one of the front 31 and rear 32 faces of the ophthalmic lens, that is to say, onto a surface that is situated between the front 31 and rear 32 faces of the ophthalmic lens 30 and that is parallel to the surface of one of these front 31 and rear 32 faces. It could also be done onto a mean surface of the ophthalmic lens, situated between the front 31 and rear 32 faces and having a curvature deduced from the curvatures of the front 31 and rear 32 faces.

In this case, as FIG. 6 shows, the projection is an orthogonal projection along the normal axis $Z_2$.

Consequently, the planar coordinates $x_3, y_3$ of the 360 third points $P_3$ of the third longitudinal profile (called the rectified longitudinal profile 52) are equal to the planar coordinates $x_1, y_1$ of the 360 points of the acquired longitudinal profile 50.

To put it another way, the projection of the acquired longitudinal profile 50 consists, for the computer unit 250, of a simple calculation of the altitudes $z_3$ of the points $P_3$ of the rectified longitudinal profile 52.

Since the front face of the ophthalmic lens 30 is in this case spherical and has a known radius of curvature $Rc_3$, the altitudes $z_3$ of the points $P_3$ of the rectified longitudinal profile 52 are calculated according to the following formula:

$$z_3 = \sqrt{Rc_3^2 - \rho_1^2} - Rc_3, \text{ with } \rho_1 = (x_1^2 + y_1^2)^{1/2}$$

Fifth Operation

The spatial coordinates $x_3, y_3, z_3$ of the points $P_3$ of the rectified longitudinal profile 52 being known, the computer unit 250 corrects, during the fifth operation, the shape of the rectified longitudinal profile 52, so that the corrected longitudinal profile 53 has a perimeter length $I_4$ equal to the perimeter length $I_1$ of the acquired longitudinal profile 50.

As FIGS. 6 and 7 show, this correction is done by a simple iterative calculation that is used to equalize its perimeter length $I_4$ with the perimeter length $I_1$ of the acquired longitudinal profile 50.

In the case in point, this calculation consists in modifying the planar coordinates $x_3, y_3$ of the points $P_3$ by applying different correction coefficients Rx, Ry along the horizontal axis $X_2$ and the ordinate axis $Y_2$, so as to modify the shape of the rectified longitudinal profile 52 in a preferred direction.

These coefficients Rx, Ry are chosen such that their sum is equal to 1 (Rx+Ry=1). The iteration steps are then as follows:

$$x_{3,j+1} = x_{3,j} \cdot \left(1 + Rx \times \frac{l_1 - l_{3,j}}{l_1}\right),$$

$$y_{3,j+1} = y_{3,j} \cdot \left(1 + Ry \times \frac{l_1 - l_{3,j}}{l_1}\right),$$

with $I_{3,j}$ being the perimeter length of the longitudinal profile characterized by the coordinate points $x_{3,j}, y_{3,j}, z_3$.

The correction coefficients Rx, Ry are chosen according to the shape of the surrounds 21 of the spectacle frame 20. As an example, these coefficients can be chosen to be equal to 0.5 if the curvature of the surrounds 21 is substantially equal to that of the ophthalmic lens 30. On the other hand, if the curvature of the ophthalmic lens 30 is greater than that of the surrounds 21, the coefficient Rx can be chosen to be equal to 3 and the coefficient Ry equal to −2.

Whatever the case, when the perimeter length $I_{3,y}$ becomes equal, to within 0.1%, to the perimeter length $I_1$ of the acquired longitudinal profile 50, the computer unit stops this iteration and stores the spatial coordinates $x_4$, $y_4$, $z_4$ of the points $P_4$ of the corrected longitudinal profile 53.

Sixth Operation

The sixth operation consists in determining the trimming setpoint for the ophthalmic lens 30, so as to trim it according to this corrected longitudinal profile 53.

This sixth operation varies according to the architecture of the trimming device used. It will not therefore be explained in more detail here.

The present invention is by no means limited to the embodiments described and represented, and those skilled in the art will be able to apply any variant thereto in accordance with the spirit of the invention.

The invention claimed is:

1. A method for generating a trimming setpoint for trimming an ophthalmic lens (30) in order to fit it in a surround (21) of a half-rim spectacle frame (20), comprising the steps consisting in:
   a) acquiring the planar coordinates ($\rho_1$, $\theta_1$) of a plurality of first points ($P_1$) characterizing the shape of a first longitudinal profile (50) of said surround (21);
   b) determining the spatial coordinates ($\rho_1$, $\theta_1$, $z_2$) of second points ($P_2$) of a second longitudinal profile (51) obtained from a projection of said first longitudinal profile (50) onto a predetermined reference surface,
   c) calculating the perimeter length ($I_2$) of said second longitudinal profile (51),
   d) determining the spatial coordinates ($\rho_1$, $\theta_1$, $z_3$) of third points ($P_3$) of a third longitudinal profile (52) obtained from a projection of the first or of the second longitudinal profile (50, 51) on a curved surface deduced from a shape parameter of the ophthalmic lens (30),
   e) correcting the spatial coordinates ($\rho_1$, $\theta_1$, $z_3$) of the third points ($P_3$), so as to equalize the perimeter length ($I_3$) of the third longitudinal profile (52) with the perimeter length ($I_2$) of the second longitudinal profile (51),
   f) deducing said trimming setpoint from said corrected spatial coordinates ($\rho_4$, $\theta_4$, $z_4$).

2. The method as claimed in claim 1, wherein, in the step a), the planar coordinates ($\rho_4$, $\theta_1$) of the first points ($P_1$) are acquired by reading, with or without contact, the contour of a presentation lens (27) associated with said surround (21).

3. The method as claimed in claim 1, wherein, in the step b), the predetermined reference surface is spherical.

4. The method as claimed in claim 3, wherein the radius of curvature ($Rc_1$) of the spherical reference surface is equal to a mean radius of curvature, predetermined from the radii of curvature of a representative range of presentation lenses.

5. The method as claimed in claim 4, wherein, in the step a), the planar coordinates ($\rho_1$, $\theta_1$) of the first points ($P_1$) are acquired in an acquisition plane ($X_1$; $Y_1$) and, in the step b), the projection is an orthogonal projection along a normal axis ($Z_1$) orthogonal to said acquisition plane ($X_1$; $Y_1$).

6. The method as claimed in claim 5, wherein, in the step b), said projection consists in a calculation of the altitudes ($z_2$) of the second points ($P_2$) relative to the acquisition plane ($X_1$; $Y_1$), according to said mean radius of curvature ($Rc_1$) and according to the planar coordinates ($\rho_1$, $\theta_1$) of the first points ($P_1$).

7. The method as claimed in claim 1, wherein, in the step c), the perimeter length ($I_2$) of the second longitudinal profile (51) is calculated according to the spatial coordinates ($\rho_1$, $\theta_1$, $z_2$) of the second points ($P_2$).

8. The method as claimed in claim 1, wherein, in the step d), said curved surface is the front (31) or rear (32) face of the ophthalmic lens (30).

9. The method as claimed in claim 1, wherein, in the step d), said curved surface is a surface situated between the front (31) and rear (32) faces of the ophthalmic lens (30).

10. The method as claimed in claim 9, wherein said curved surface is parallel to one of the front (31) and rear (32) faces of the ophthalmic lens (30).

11. The method as claimed in claim 1, wherein,
   in the step a), the first longitudinal profile (50) is acquired in a frame of reference of the surround (21) identified by a horizontal axis ($X_1$), and
   in the step d), the third longitudinal profile (52) is determined in a frame of reference of the ophthalmic lens (30) identified by a horizontal axis ($X_2$), previously made to coincide with the frame of reference of the surround, by aligning their horizontal axes ($X_1$, $X_2$).

12. The method as claimed in claim 1, wherein, in step a), the planar coordinates ($\rho_1$, $\theta_1$) of the first points ($P_1$) are acquired in an acquisition plane ($X_1$; $Y_1$) and, in step b), the projection is an orthogonal projection along a normal axis ($Z_1$) orthogonal to said acquisition plane ($X_1$; $Y_1$).

* * * * *

UNITED STATES PATENT AND TRADEMARK OFFICE
CERTIFICATE OF CORRECTION

PATENT NO. : 8,205,986 B2  
APPLICATION NO. : 12/875590  
DATED : June 26, 2012  
INVENTOR(S) : Frederic Dubois Page 1 of 1

It is certified that error appears in the above-identified patent and that said Letters Patent is hereby corrected as shown below:

In column 6, line 58, please amend "8" to read -- $\theta$ --

In column 9, line 20, please amend the formula to read $$-- I_2 = \sum_{i=0}^{359} \sqrt{(x_{2,i+1} - x_{2,i})^2 + (y_{2,i+1} - y_{2,i})^2 + (y_{2,i+1} - y_{2,i})^2} --$$

In column 11, line 47, please amend "$(\rho_4, \theta_1)$" to read -- $(\rho_1, \theta_1)$ --

Signed and Sealed this  
Twenty-eighth Day of August, 2012

David J. Kappos  
*Director of the United States Patent and Trademark Office*